Nov. 3, 1953
R. R. STEIN
2,658,122
PRESSURE SWITCH
Filed Jan. 27, 1950
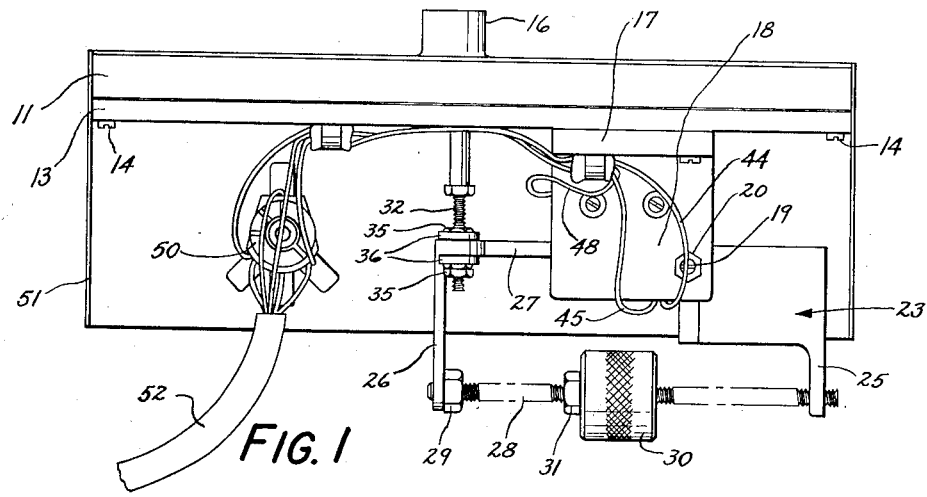
FIG. 1
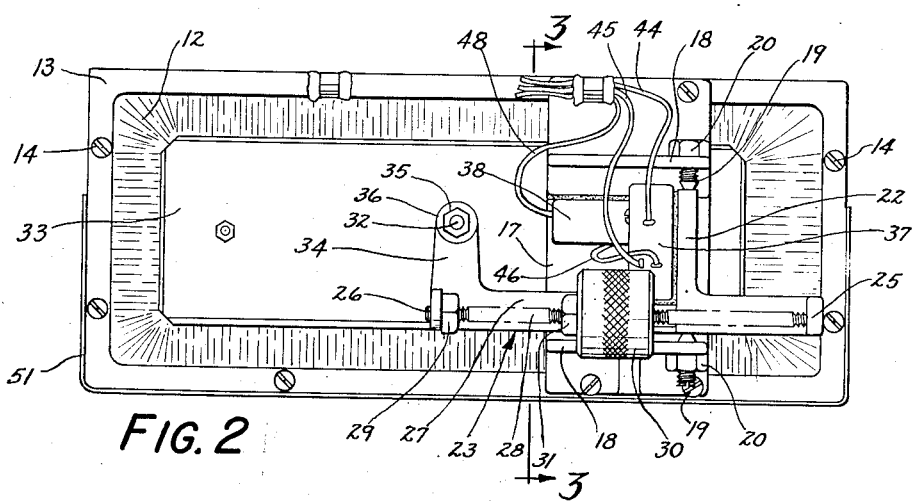
FIG. 2
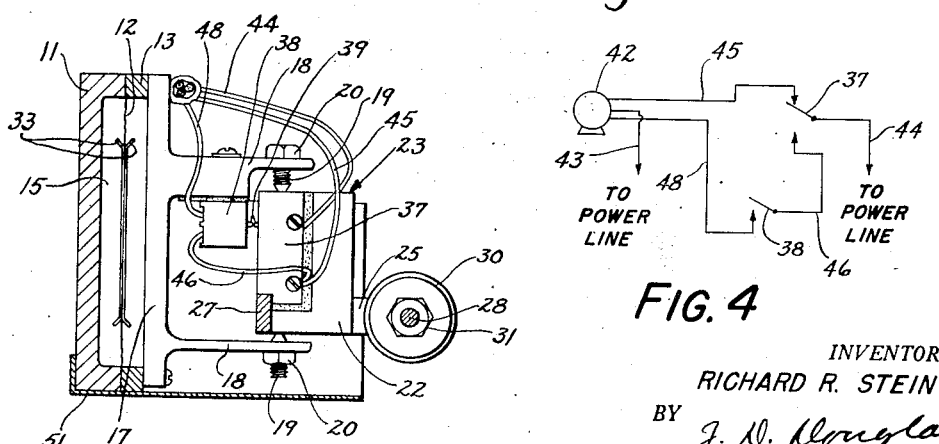
FIG. 3
FIG. 4
INVENTOR.
RICHARD R. STEIN
BY
J. D. Douglas
His atty.

UNITED STATES PATENT OFFICE 2,658,122

PRESSURE SWITCH

Richard R. Stein, Cleveland, Ohio, assignor to Cleveland Fuel Equipment Company, Cleveland, Ohio Application January 27, 1950, Serial No. 140,853

2 Claims. (Cl. 200—83)

This invention relates to control devices, and more particularly to a control switch device for a furnace damper control or the like.

Controls for industrial furnaces are customarily operated by the force of the draft in the stack. The control which is operated thereby is frequently interconnected with other controls operated by steam pressure in a steam line or similar indicators to operate burner igniters, stoker motors, damper control motors or the like.

My invention is designed primarily for use with such a system and forms the switching device sensitive to the draft in the combustion chamber. In general, such devices must be adapted to control a reversible motor which will control the position of a damper, the speed of a fan or the like. It is, therefore, my purpose to provide a device sensitive to pressure which will operate a reversible motor to cause it to turn in one direction below a certain minimum pressure and to turn the opposite direction above a certain maximum pressure and to remain stationary at pressures between the limits defined. It will be apparent that my device need not be limited to use in combustion controls but may find use in any application where it may be desired to operate a motor responsive to pressure.

The novel means in which I embody my invention are described hereinafter in reference to the following figures which form a part of this specification.

In the drawings:

Fig. 1 is a side elevational view of my novel control device;

Fig. 2 is a bottom plan view of the device;

Fig. 3 is a sectional view along line 3—3 of Fig. 2; and

Fig. 4 is a wiring diagram showing the method of using my device.

Briefly, my invention comprises a pressure chamber enclosed by a flexible diaphragm. A balance device having an adjustable weight is connected to said diaphragm adapted to be operated thereby, and a pair of switches having different operating pressures are arranged so as to engage each other to be inter-operated and are connected to provide a switching of electrical power from one line to another upon being operated but having a neutral position in the pressure range between the two different operating pressures.

More specifically, and with reference to the figures, my device comprises an inverted dished member 11 having one side of fairly large area closed by a flexible diaphragm 12 composed of some airtight flexible material, such as rubber impregnated fabric. The diaphragm 12 is held in place by a peripheral ring 13 held to the dished member 11 by screws 14. Thus, a closed chamber 15 is formed in the dished member 11. A pipe connection 16 adapted to be connected to a device, the pressure in which is to be the measure of control, opens into the chamber 15.

A bracket 17 having vertically dependent arms 18 is mounted on the ring 13. A pivot in the form of a sharp pointed screw 19 is threaded into each of the arms and is held in position by a jam nut 20. The points of the screws 19 extend into sockets in the web 22 of the swinging balance member 23. The pivots may be adjusted to allow the member 23 to swing freely and are then held in adjustment by the jam nut 20.

The balance member 23 serves primarily as a balance arm. It is formed of a roughly cramped-shaped member having two depending brackets 25 and 26 extending downward from the ends of the main arm 27. A screw threaded bar 28 is supported by the brackets 25 and 26, being loosely journalled in the bracket 25 and screw threaded into the bracket 26. A jam nut 29 on the bar 28 holds it in place in the bracket 26. This type of mounting is used in order to allow for possible different rates of expansion of the arm 27 and the bar 28. A weight 30 is threaded onto the bar 28 and is adjustable over the length of the bar, but may be held in place by a nut 31 threaded onto the bar and jammed against the weight 30.

The transverse web 22 is formed in the bar substantially nearer one end of the arm 27 than the other. However, it is located so that the weight 30 may be adjusted to counterbalance the weight of the overhanging part of the arm 27 and threaded bar 28.

The balance member 23 is fixed to the diaphragm 12 to be operated thereby through a bolt 32. The bolt is clamped to the center of a pair of large rectangular metal plates 33 which act as washers and hold the bolt to the diaphragm 12 as well as sealing the opening through which the bolt extends. These plates 33 are large and are bent away from the diaphragm at their edges in order to protect the diaphragm from being torn or otherwise damaged. The bolt 32 extends downwardly from the plates 33 through an ear 34 formed on the arm 27. Nuts 35, one above and one below the ear 34, and spaced therefrom by soft felt washers 36, allow a slight amount of freedom to permit the arm 27 to be tilted slightly with respect to the bolt 32 as would be required by movement of the diaphragm upward or downward. By this arrangement, it is evident that an adjustment of the member 23 with respect to the diaphragm is possible.

It is apparent that, by this balance arrangement, any change in the draft in the chamber to which the fitting 16 is connected will cause a change in position of the diaphragm and therefore of the balance member 23 within the limits of free movement of the diaphragm, and the absolute values of pressure required to tilt the balance member 23 may be set by adjusting the weight 30 on the threaded bar 28.

The movement of the balance member 23 is utilized to operate a pair of switches which energize an electrical means to operate the combustion control with which it is proposed this device be used. This control may be a damper of some sort or alternatively a forced draft fan or other control. The switches might also control any other device responsive to a pressure in any chamber to which the tube 16 is connected. It is, therefore, not my intent to limit the use of my device to combustion controls by describing it in connection therewith.

The switches are mounted in a novel manner in order to be operated by the balance device. The first switch 37 is mounted on the web 22 of the balance member, and the second switch 38 on one of the brackets 18 adjacent the first switch. These switches may preferably be micro-switches operated by very small movements of their operating buttons 39. The switches are mounted so that the buttons abut each other and, therefore, so that sufficient movement of the balance member 23 will operate both switches.

In order to provide for an interval where the device to be controlled by the switches is not operated, the switches are picked having different operating pressures. Thus, for example, switch 37 may be operated by three ounces force and switch 38 by four ounces. Then as the diaphragm is pulled upward by the draft, the member 23 rocks upward until the buttons 39 are engaged. Then the draft may increase until the force at the buttons 39 reaches three ounces. At that point switch 37 will be operated. Then until the draft increases and the force reaches four ounces only one switch has been operated and there is thus provided an interval between the operation of the two switches. The absolute amounts of force used in the illustration have been found to work satisfactorily in a combustion control device but are not limiting amounts. It is readily apparent that the size of diaphragm, amount of pressure in the control chamber, length of arm between the pivot points 19 and the bolt 32, and between the points 19 and buttons 39 may all be varied and each would have an important bearing on the desired force used on the switches 37 and 38. It is also envisioned that a lever system might be used between two switches having the same required operating pressure. The levers would then have unequal arms to produce the difference in forces necessary to provide the hiatus in operating times.

A wiring diagram illustrative of one manner of connecting the switches is shown in Fig. 4. In this diagram a three-wire reversible motor 42 is the device to be controlled. As is customary with this type motor, one lead 43 is connected to the power source, and the direction of rotation of the motor is determined by which one of the other two wires is also connected to the source of power. In the illustrated diagram, the wire 44 extends from the power line to the switch 37. This switch is a single-pole double-throw switch adapted to be operated by three ounces of force. The switch is wired so that the normally-closed throw is connected to one wire 45 of the motor 42 so that if the force on the operating button 39 of the switch 37 is less than three ounces, the motor will run in one direction. The normally-open throw of the switch is connected by wire 46 to the switch 38.

The switch 38 may be a normally-open single-pole single-throw switch or a single-pole double-throw with the normally-closed throw not used. This switch is operated by a larger pressure which, in the example, is taken as four ounces. The third wire 48 from the motor 42 is connected to this switch. Thus when the force on the operating buttons 39 of the switches reaches three ounces, the switch 37 is thrown, thus disconnecting the motor 42 from the power line lead 44 and connecting that lead to the switch 38. However, since this switch 38 is normally open and is not yet operated, the motor is disconnected and will stop. The weight 30 of the balance member 23 is presumably adjusted so that the pressure on the diaphragm at this condition is that desired to be maintained. If the force on the switch buttons 39 should continue to increase and reach four ounces, the switch 38 would be thrown and the motor wire 48 be connected to the power line. The motor 42 then would run in a direction opposite to its initial rotation. The motor may be used to control the position of a damper for a furnace or any well known speed controlling device of a draft fan, and its reversal should result in a decrease of force on the switch buttons 39. When the force drops below four ounces or somewhat less, depending on the differential pressure in the operation of a particular switch, the switch 38 will again be opened, and the motor 42 stopped until the pressure drops to three ounces or somewhat less as explained above, at which point it would be reversed. However, the fluctuations soon cease, and the pressure becomes stabilized at a value such that the force on the switch buttons 39 is between three and four ounces, and the motor 42 is not running.

It will be apparent to those skilled in the art that other wiring arrangements can be used to accomplish the same result. For instance, the wire 44 could be connected directly to the wire 46, and the switch 37 could then be a normally closed, single-pole, single-throw switch adapted to be opened by a lower force than that required to operate switch 38. It will further be apparent that my novel arrangement of balance arm and switches need not be operated by a diaphragm but that any device capable of producing the force necessary to swing the balance member may be used.

The wires 44, 45 and 48, which lead to the switches from the motor 42 or the power line, may be connected to a switch 50 mounted on a protective panel 51 about the device. This switch 50 is wired in a manner well known in the art to provide for non-automatic control of the damper or the like, and forms no part of the present invention. A cable 52 may be provided for the proper leads extending from the switch 50 to devices beyond the device.

Thus, it is apparent that, because of the steady pressure on the arm, my device is less subject to operation by external vibration and the like than devices using mere spatial intervals between the arm and the switch.

Having thus described my invention, I am aware that numerous and extensive departures may be made therefrom without departing from the spirit or scope of my invention.

I claim:

1. A control device comprising a frame, a balance member pivotally disposed on the frame, a first switch mounted on said frame, a second switch mounted on said balance member, each of said switches having separate operating members, the operating members of the respective switches being located in constant abutting relationship to each other, one of said switches requiring greater force for its operating than the other thereby providing an interval between operation of the two switches.

2. An apparatus of the class described including a housing forming a closed chamber provided with conduit means for connection to a source of fluid pressure, a diaphragm for said chamber disposed in a horizontal plane and movable by said fluid pressure, a pair of arms extending downward from said frame and adjustable pivot means carried by each of said arms in alignment with each other, a balance member supported by said pivots at an intermediate point and movable about said pivots, said pivots providing a horizontal suspension for said balance member and said member having portions extending laterally on each side of said pivots and means connecting one end of said member to said diaphragm, said balance member being formed with downwardly depending arms on each end in alignment with each other, and threaded rod means disposed in said arms, one end of said rod being threaded through and locked in one of said arms and the other end slidably disposed in the other arm, said rod extending parallel to balance member and weight means for said rod adjustably threaded on said rod to adjust the balance of the balance member, and a first switch carried by said frame and a second switch carried by said balance arm, each of said switches having separate operating members disposed in constant opposing engagement with each other, one of said switches being formed to operate upon application of a predetermined pressure and the other of said switches formed to operate at a different pressure.

RICHARD R. STEIN.

References Cited in the file of this patent

UNITED STATES PATENTS

| Number | Name | Date |
|---|---|---|
| 1,670,313 | Oswald | May 22, 1928 |
| 1,983,429 | Albright | Dec. 4, 1934 |
| 2,357,878 | Crew | Sept. 12, 1944 |
| 2,442,108 | Zeller et al. | May 25, 1948 |
| 2,480,847 | Geisel | Sept. 6, 1949 |
| 2,515,087 | Hiday | July 11, 1950 |
| 2,562,847 | Spencer | July 31, 1951 |